(12) United States Patent
Romao

(10) Patent No.: US 6,310,461 B1
(45) Date of Patent: Oct. 30, 2001

(54) MOBILE TELEPHONE COMPRISING AN IMPROVED BATTERY CHARGER CIRCUIT

(75) Inventor: Fernando Romao, Montesson (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/605,215

(22) Filed: Jun. 28, 2000

(30) Foreign Application Priority Data

Jul. 5, 1999 (FR) .................................................. 99 09054

(51) Int. Cl.[7] ....................................................... A42J 7/00
(52) U.S. Cl. ............................................................ 320/114
(58) Field of Search ................................... 320/107, 114, 320/137; 323/282, 283, 351

(56) References Cited

U.S. PATENT DOCUMENTS 5,633,574   5/1997  Sage ........................................ 320/21
5,747,969   5/1998  Tamai ..................................... 320/141

FOREIGN PATENT DOCUMENTS 0580180   1/1994   (EP) .
0665443   8/1995   (EP) .

Primary Examiner—Peter S. Wong
Assistant Examiner—Gregory J Toatley, Jr.
(74) Attorney, Agent, or Firm—Nilles & Nilles SC

(57) ABSTRACT

The leakage current in a circuit for charging a battery is eliminated by placing a switch in series with the resistor connecting the emitter and the base of a transistor. When this switch is open the current can no longer flow through and there is therefore no longer any leakage current. This switch is controlled by a microprocessor through a bus and the battery can be charged in pulsed mode. Furthermore, the circuit has no protection diode against reverse voltage and over voltage.

6 Claims, 2 Drawing Sheets

MOBILE TELEPHONE COMPRISING AN IMPROVED BATTERY CHARGER CIRCUIT

BACKGROUND OF THE INVENTION

1. Field of the Invention

An object of the invention is a mobile telephone comprising an improved battery charger circuit. The field of the invention is that of battery-operated autonomous devices and especially that of autonomous devices that require a high degree of autonomy. This is the case in the mobile telephone. The purpose of the invention is to reduce the number of components and the cost of the battery charger circuit.

2. Description of the Prior Art

In the prior art, there is a known battery charging circuit whose input is a diode followed by a bipolar transistor or field-effect transistor. The diode is connected to the emitter of the bipolar transistor. Between the emitter and the base of the transistor, a resistor is connected and between the base and the ground, a transistor, which is for example a CMOS transistor, is connected. The collector of the bipolar transistor is connected to the battery. To charge the battery, the diode is connected to a power source, for example a current generator.

This circuit has two drawbacks. A first drawback is the presence of the diode which is very bulky and therefore hampers integration. Its presence is made necessary in cases when the input of the charging circuit might be shorted to ground. Indeed, the voltage which would then exist at the terminals of the emitter or collector of the bipolar transistor would be equal to the battery voltage which can be higher than 5 volts. In this case, the bipolar transistor would be destroyed and there would no longer be any other means of recharging the autonomous device.

The second problem is a problem of charge loss in the battery. Indeed, real transistors are not perfect and there is a leakage current between the collector and the base. This leakage current, while it is low, may be compared for example to the consumption of a mobile telephone in standby mode. The existence of this leakage current therefore reduces the autonomy of the portable telephone in the case of a short-circuit at input of the charger.

The invention resolves these problems firstly on the basis of the observation that, with present-day technologies, most batteries have a voltage of less than 5 volts. It is therefore no longer necessary to use a protection diode to prevent reverse voltages and overvoltages. Furthermore, the second problem is resolved by the series-connection of a switch with the resistor. This switch is parallel-controlled with the CMOS transistor. Thus, during the charging of the battery, the CMOS transistor will be on and the interrupter closed. When the battery is no longer being charged, the switch is open and the CMOS transistor is off. An alternative solution consists in placing a high-value resistor, of about 100 megohms, ensuring a low reverse current. Thus, according to the invention, between the emitter and the base of the bipolar transistor, there is infinite resistance when the battery is no longer charged. The leakage current therefore becomes zero. Furthermore, the resistor is sized so that the time constant of the charging circuit enables the battery to be charged in pulsed mode. The invention thus resolves all the problems related to the earlier embodiments. In particular, the battery charging circuit is a system of charging without a protection diode against reverse voltages and overvoltages.

SUMMARY OF THE INVENTION

An object of the invention therefore is a mobile telephone comprising an improved charging circuit for a battery comprising:

a current generator connected between a ground and a first terminal of a control device, a resistor connected between the first terminal and a second terminal of the control device, a first switch connected between the second terminal and the ground, a third terminal of the control device connected to a battery, wherein the resistor is series connected, between the first terminal and the second terminal, with a second switch.

BRIEF DESCRIPTION OF THE DRAWINGS

The invention will be understood more clearly from the following description and the appended figures. These figures are given only by way of an indication and in no way restrict the scope of the invention. Of these figures.

MORE DETAILED DESCRIPTION

Figure 1:
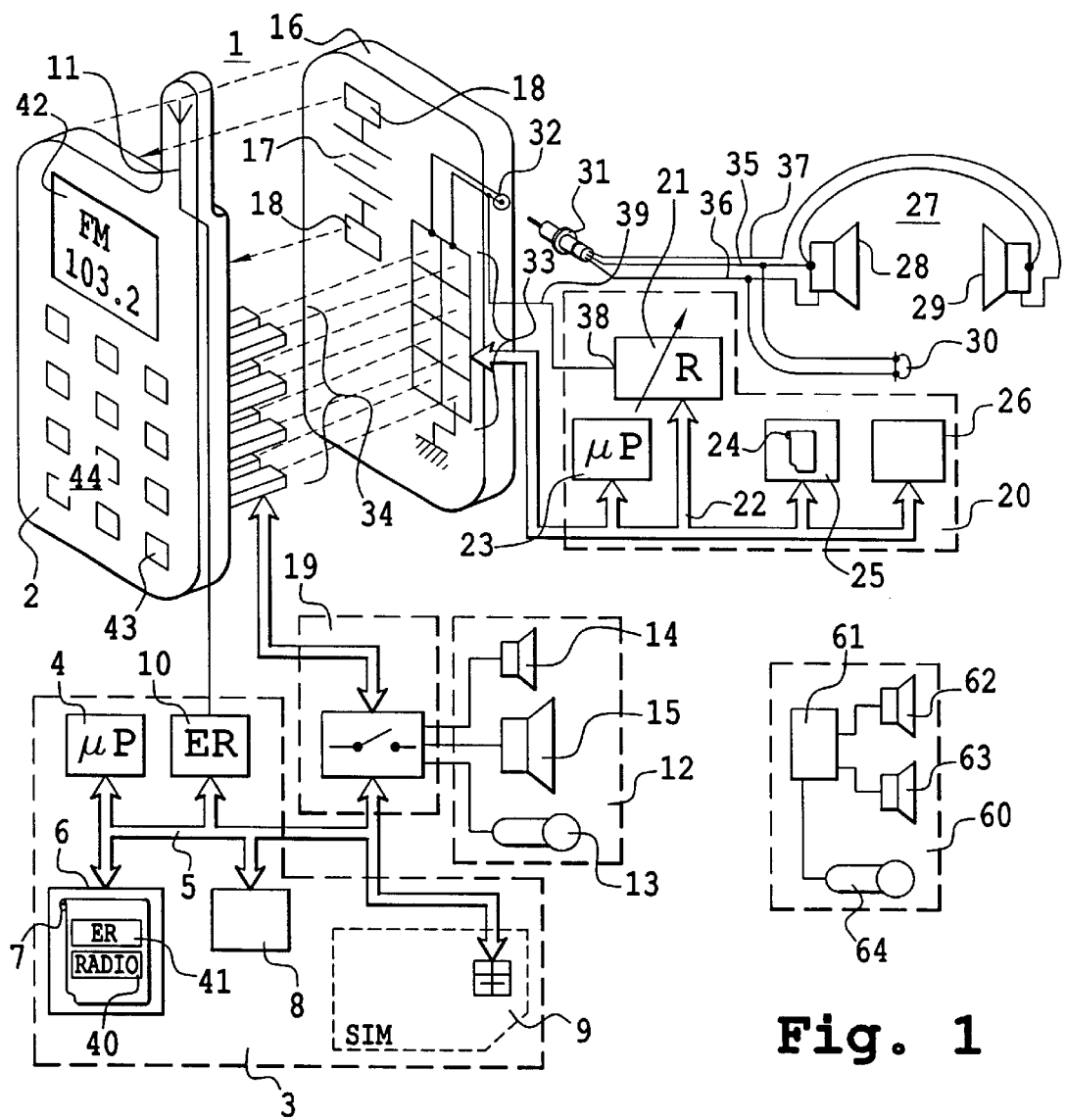
FIG. 1 illustrates a charging circuit according to the invention and the means needed for making it.

FIG. 1 shows a charger 101 and a mobile telephone 102. The telephone 102 has a charging circuit 103 connected by an output 104 to a battery 105. The battery 105 is furthermore connected to a ground 106. The circuit 103 has a control device 107 which, in a preferred embodiment, is a bipolar transistor. It is therefore truly a three-terminal control device. An input 108 of the circuit 103 corresponds to the emitter of the transistor 107, the output 104 of the device 103 corresponds to the collector of the transistor 107. The base of the transistor 107 is connected to the ground through a field-effect type transistor 109. The emitter 108 of the transistor 107 is connected to the base of the transistor 107 through a resistor 110 and a switch 111. The switch 111 and the resistor 110 are series-connected. The switch 111 and the transistor 109 are controlled by means of a bus 112. The bus 112 contains wires or tracks corresponding to address, data and control signals. The transistor 109 is controlled through its gate 113. The switch 111 and the bus 112 form a suppression device 114. In practice, the switch 111 is made by means of a transistor or any other known selector switch means. Similarly, the transistor 109 is a selector switch means to open and close a circuit.

The charger 101 has a current generator 115. The term "current generator" is understood to mean any device delivering current with a non-zero DC component. When the charger 101 and the telephone 102 are connected, the generator 115 is connected firstly to the emitter 108 of the transistor 107 and, secondly, to the ground 106. The charger 101 also has a jumper 116. When the telephone 102 is placed on the charger 101, the jumper 116 shorts a pin 117 and a pin 118 of the telephone 102. The pin 117 is connected to a voltage generator 119 and the pin 118 is connected to the bus 112. The telephone 102 also has a microprocessor 120 which itself is associated with the bus 112. The device constituted by the elements 116 to 119 is therefore a detection device because the telephone 102 has been placed in a charging position. The device 116 to 119 is given only to illustrate the detection but, in practice, it can be made differently.

The telephone 102 also has means 121 to manage the charging of the battery 105. The means 121 comprise the microprocessor 120, a memory 122 and a clock 123. The memory 122 and the clock 123 are connected to the bus 112. The memory 122 contains the instruction codes of the program by which the microprocessor 120 can manage the charging of the battery 105. The clock 123 sets the rate of the activity of the microprocessor 120. It may be a quartz crystal for example. The memory 122 furthermore has the data and working spaces needed for the activity of the microprocessor 120.

The telephone 102 also has a keypad 124, a liquid crystal screen (LCD) 125 and a radiofrequency transmission/ reception circuit 126 connected to an antenna 129. The elements 125 to 126 are connected to the bus 112.

The elements 120 and 122 to 126 are powered by the battery 105. Certain elements like the screen 125 and the circuit 126 are respectively connected to the battery 105 by means of switches 127 and 128 respectively. The switches 127 and 128 are connected to the bus 112 so that they are controlled by the microprocessor 120.

During the charging of the battery 105, the unnecessary elements of the telephone 102 such as the circuit 126 are deprived of power. Thus, they no longer consume any energy and the charging time of the battery 105 is thereby diminished.

However, this does not mean that the telephone cannot be called. Indeed, there are standby circuits that consume minimum power. These circuits are used for permanently listening for information received by the telephone 102 during its various temporal meetings as defined by the GSM standard with the base station to which it is connected. If this information tells the mobile telephone that there is an incoming call, then a program contained in the memory 122 and executed by the microprocessor 120 interrupts the charging of the battery 105, activates the dormant circuits of the telephone 102 and takes the incoming call into account. Similarly, if the user seeks to make an outgoing call, a pressure on the keypad 124 will similarly interrupt the charging of the battery 105 and enable the user to make his outgoing call.

With the development of technologies and, especially, with increasingly dense integration, circuits are consuming less and less power. For identical functions, less and less power is needed. Indeed, for larger numbers of functions less power is needed than was the case for the first mobile telephones that came into use. It is therefore possible to use batteries with voltages of below 5 volts. This means especially that the transistor 107 does not have to be shielded against short circuits that might occur between its transmitter and the ground. Indeed, the emitter/collector junction can withstand a voltage of less than 5 volts for a bipolar transistor.

When the user of the telephone 102 places it on the charger 101, the microprocessor 120 will detect this action, through the detection device, namely the elements 116 to 119. The telephone 102 can then measure the levels of the charging of its battery.

Figure 2:
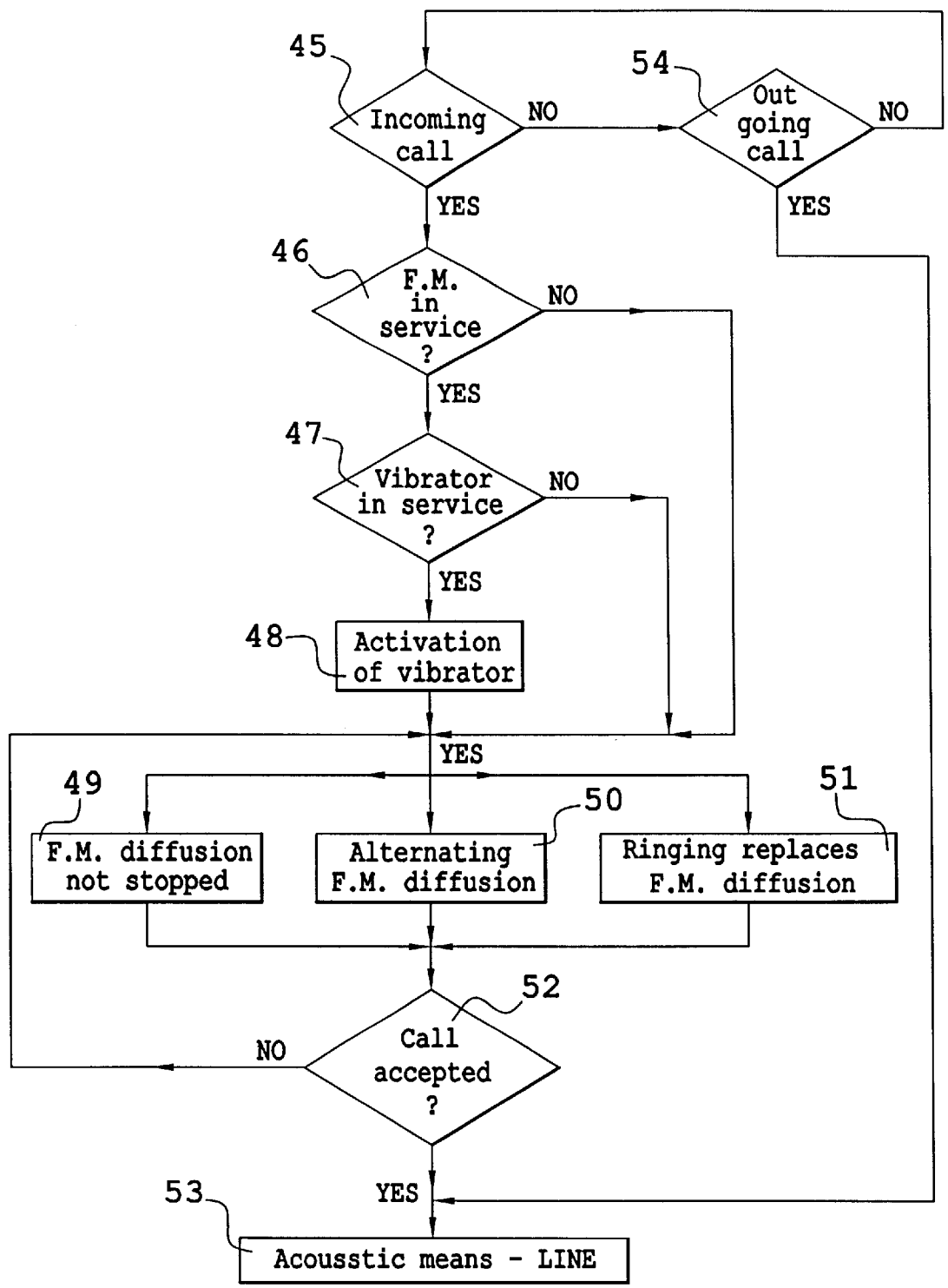
FIG. 2 illustrates a circuit to measure the level of the battery.

FIG. 2 illustrates a simple circuit for measuring the voltage of the battery 105. FIG. 2 shows the battery 105 connected between the ground 106 and an input of a multiplexer 201. The output of the multiplexer 201 is connected to an analog-digital converter 202. The analog-digital converter is furthermore connected to the bus 112. When the microprocessor 120 wishes to know the voltage of the battery 105, it positions an address corresponding to the multiplexer 201 on the bus 112. This address informs the multiplexer 201 that its output must correspond to the battery 105. Then the microprocessor reads the output of the converter 202. It then has the value of the voltage of the battery 105 at its disposal. In practice, the device described in FIG. 2 may be entirely or partly integrated into the microprocessor 120. On the basis of this measurement, the microprocessor 120 decides whether or not the battery 105 must be charged. The user is alerted to this decision by a symbol on the screen 125 for example. This may be a figure of a battery that flashes when the battery 105 is being charged and no longer flashes when the battery 105 is already charged. In this example, if the microprocessor 120 decides that the battery 105 should not be charged, the figurative symbol will not flash. If on the contrary the battery has to be charged, the symbol will start flashing.

Should it be necessary to charge the battery, the microprocessor 120 will activate the switch 111 and the transistor 109 to make them go into the closed position. In the present description, it is assumed that a closed transistor means that the transistor is on while an open transistor is off. The current will then go through the resistor 110, creating a voltage at its terminal. This will switch the transistor 107 into "on" mode. The battery 105 will then get charged. During the charging, the microprocessor 120 regularly takes measurements of the charge of the battery 105 in order to make sure that this charge does not go beyond the threshold of destruction of the battery 105.

Figure 3:
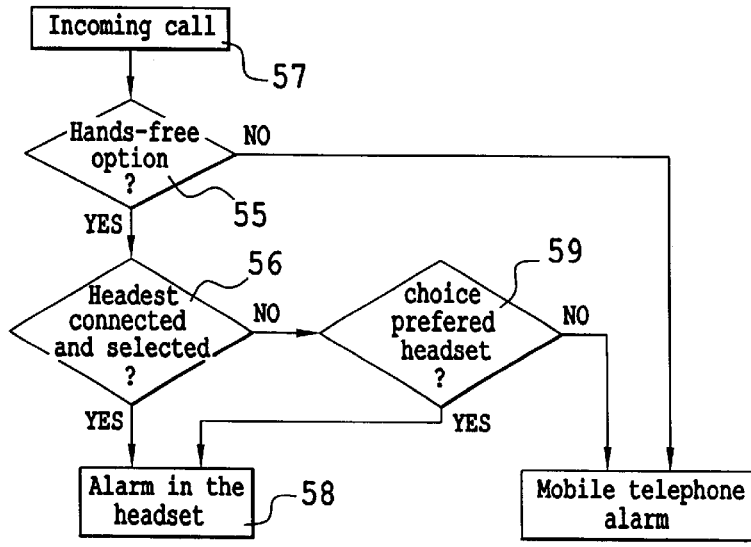
FIG. 3 illustrates periods where the charging circuit is on in a pulsed charging mode.

FIG. 3 illustrates the cycles in which the switches 111 and the transistor 109 are controlled by the microprocessor 120. In the graph of FIG. 3, the X-axis depicts the time which the Y-axis gives the state of the switch 111 and transistor 109. 0 means that the switch 111 and the transistor 109 are open and 1 means that they are closed. At a date t0, arbitrarily chosen for the purposes of the description, the user 102 places his telephone on the charger 101. The microprocessor 120 finds out if the battery 105 needs to be charged by measuring its charging level. The microprocessor 120 then commands the switches 111 and the transistor 109 into the closed position up to a date t1. Then the microprocessor 120 takes a new measurement and, if the battery 105 still needs to be charged, it activates a new period of closure of the switches 111 and of the transistor 109 between a date t2 and t3. The dates t2 and t3 are subsequent to t1 and t3 is subsequent to t2. The operations of measuring the charging level of the battery and of the closing of the switches 111 and the transistor 109 form a cycle that is repeated until a charging threshold is reached. The charging threshold is below the threshold of destruction of the battery 105.

As and when the charging voltage of the battery approaches the charging threshold, the durations of closure of the switches 111 and of the transistor 109 get reduced. Let d1 be the duration from t0 to t1, d2 the duration from t2 to t3 and d3 the duration from t4 to t5. Then d1 is higher than d2 which is itself higher than d3. This is a pulsed mode charging operation. The fact that the durations decrease as and when the battery gets charged is made necessary by the desire to approach the charging threshold as closely as possible. This charging threshold itself is close to the threshold of destruction of the battery. By approaching this threshold gradually, the risks of it crossing it are diminished.

To make charging mode, known as the pulsed mode, possible and above all efficient, the switch-over time of the circuit 103 should be fast. The term "switch-over time" of the circuit 103 is understood to mean the time needed to set up the stationary mode on the output port 104 of the device 103 from the time when the microprocessor 120 has ordered the closure of the switches 111 and the transistor 109. This parameter is set by the choice of the value of the resistor 110. The smaller the switching time of the circuit 103, the faster will be the charging of the battery 105.

What is claimed is:

1. A mobile telephone comprising an improved charging circuit for a battery comprising:
   a current generator connected between a ground and a first terminal of a control device,
   a resistor connected between the first terminal and a second terminal of the control device,
   a first switch connected between the second terminal and the ground,
   a third terminal of the control device connected to a battery, wherein the resistor is series-connected, between the first terminal and the second terminal, with a second switch.

2. A telephone according to claim 1, wherein the control device is a bipolar type transistor, the first terminal is the emitter of the transistor, the second terminal is the base and the third terminal is the collector.

3. A telephone according to claim 1, wherein the first switch is formed by a field-effect transistor.

4. A telephone according to claim 1, wherein the voltage of the battery, once charged, is lower than or equal to 5 volts.

5. A telephone according to claim 1, comprising means to control the switches.

6. A telephone according to claim 1, wherein the charging circuit has a switch-over time shorter than the duration of closure of the switches and of the transistor, this condition enabling a charging of the battery in pulsed mode.

* * * * *